United States Patent
Hay et al.

(10) Patent No.: US 10,762,639 B1
(45) Date of Patent: Sep. 1, 2020

(54) DETAILED VISUAL INSPECTION OF COMPONENT IN PERIODIC MOTION

(71) Applicant: RDI TECHNOLOGIES, INC., Knoxville, TN (US)

(72) Inventors: Jeffrey R. Hay, Louisville, KY (US); Mark William Slemp, Tellico Plains, TN (US); Kenneth Ralph Piety, Knoxville, TN (US)

(73) Assignee: RDI TECHNOLOGIES, INC., Knoxville, TN (US)

( * ) Notice: Subject to any disclaimer, the term of this patent is extended or adjusted under 35 U.S.C. 154(b) by 0 days.

(21) Appl. No.: 16/748,065

(22) Filed: Jan. 21, 2020

Related U.S. Application Data (60) Provisional application No. 62/795,189, filed on Jan. 22, 2019.

(51) Int. Cl.
| | |
|---|---|
| *G06T 7/215* | (2017.01) |
| *G06T 3/40* | (2006.01) |
| *G06T 7/246* | (2017.01) |
| *G06T 7/254* | (2017.01) |

(52) U.S. Cl.
CPC ............ *G06T 7/215* (2017.01); *G06T 3/4053* (2013.01); *G06T 7/248* (2017.01); *G06T 7/254* (2017.01)

(58) Field of Classification Search
CPC ......... G06T 7/215; G06T 7/248; G06T 7/254; G06T 3/4053
See application file for complete search history.

(56) References Cited

U.S. PATENT DOCUMENTS

| | | | |
|---|---|---|---|
| 6,636,220 B1 * | 10/2003 | Szeliski | ................. G06T 13/80 345/475 |
| 10,250,868 B1 | 4/2019 | Arnold | |
| 2002/0005895 A1 | 1/2002 | Freeman | |
| 2004/0196448 A1 | 10/2004 | Rembe | |
| 2009/0083814 A1 | 3/2009 | Sekine | |
| 2009/0244261 A1 | 10/2009 | Maehner | |
| 2009/0273704 A1 | 11/2009 | Picenti | |
| 2012/0229659 A1 * | 9/2012 | Solomon | ............. H04N 5/3572 348/207.11 |
| 2015/0239686 A1 | 8/2015 | Stone | |
| 2016/0085840 A1 | 3/2016 | Dixit | |
| 2016/0217574 A1 * | 7/2016 | Kang | ................. G01S 15/8915 |
| 2017/0109984 A1 * | 4/2017 | Child | ................. H04M 1/0291 |
| 2017/0180645 A1 * | 6/2017 | Weckel | ............. H04N 5/23251 |
| 2017/0359549 A1 * | 12/2017 | Baran | .................... H04N 5/772 |
| 2018/0194314 A1 | 7/2018 | Da Costa | |

\* cited by examiner

*Primary Examiner* — Carol Wang (74) *Attorney, Agent, or Firm* — Wyatt, Tarrant & Combs, LLP; Stephen C. Hall (57) ABSTRACT

Current embodiments provided herein include methods for visualizing repetitive movements which use video image files acquired with an appropriate frame rate, which is based on the period of repetition and minimal exposure, to reorganize the presentation of the frames to freeze the motion of the object in motion at any point in the cycle of repetition or to display the isolated frequency of repetition or a video of the amplified motion to enable the detailed visual inspection of an object in motion, and without having to stop the motion.

18 Claims, 6 Drawing Sheets
(6 of 6 Drawing Sheet(s) Filed in Color)

DETAILED VISUAL INSPECTION OF COMPONENT IN PERIODIC MOTION

CROSS REFERENCE TO RELATED APPLICATIONS

This application claims the benefit of priority to U.S. Provisional Application No. 62/795,189, which was filed on Jan. 22, 2019, the contents of which are fully incorporated herein by reference.

FIELD OF INVENTION

The present embodiments pertain to systems, apparatuses, and methods for analyzing movements in machinery, machine components, and inanimate physical structures; processing of visual data related to such movements; and visual inspection of moving components by reconstructing video images that have enhanced frequency or angular resolution than could be achieved without the use of digital photography.

BACKGROUND

All machines and physical structures produce vibrations and resonances of various kinds, some of which may be characteristic of normal operation and others of which may indicate off-normal conditions, unusual wear, incipient failure, or other problems. In the field of predictive maintenance, the detection of vibrational signatures is a key element of the diagnostic process in which the goal is to identify and remedy incipient problems before a more serious event such as breakdown, failure, or service interruption occurs. Often it is desirable to visually inspect a mechanical component to determine if physical damage is present. This can be done by stopping the motion and performing a physical inspection; however, shutting equipment down and interrupting its operation to determine the presence of a fault condition or the extent of damage is undesirable.

One method that has been used to perform visual inspections while a machine is still in operation is by means of a stroboscope. This instrument flashes a high intensity light at user selected frequencies. When the frequency of flashing is exactly at the frequency of interest, the motion of the moving component appears to freeze. When the frequency of flashing differs slightly from the frequency of motion, then the component will appear to turn very slowly in a forward or backward direction. However, the stroboscope is limited by the perception of the human eye. Very slow frequencies are too intermittent to give a perception of stopping the motion because there is too large of a delay between the flashes. At very high frequencies, the flashes are so close together that the eye only sees a steady source of light and this prevents the motion from appearing to be frozen.

Since digitally captured data can be played back at any frequency which suits the perception capabilities of the human eye, it allows very slow or very fast frequencies to be rendered in a visually perceptive manner. Additionally, by selecting sample rates which are not synchronous with the frequency of interest, reconstructed video output can render what appears to be a very high angular resolution of the component which would normally only be achievable by cameras with a very high frame rate. When the frequency of interest is too high to be adequately characterized satisfactorily by the frame rate of the camera, the digital phenomena of aliasing still allows a video stream to be constructed that provides a very high detail examination of the component as it progresses through its cycle.

Also, whereas a stroboscope depends on the skill of the user to locate the correct frequency of motion and then to make the component turn slowly, by comparison a more preferred video system would only require the user to identify the object of interest by making a graphical selection from a single frame of the video. The system could automatically, and without variability that depends on user actions, determine the frequency of motion, calculate an optimum frame rate, set the shutter rate to the maximum or equivalently sets the brightness control or exposure time to the minimum value or sufficiently small enough value, collect the needed data, and reconstruct an output video which would enable a visual inspection of the component with very high resolution. Current embodiments are directed to providing this advantage with digital photography and video.

U.S. Pub. No. 2016/0217587 titled "Apparatus and Method for Analyzing Periodic Motions in Machinery" (Hay, Jeffrey R.; published Jul. 28, 2016), and later issued as U.S. Pat. No. 10,459,615, the contents of which are incorporated by reference herein, describes multiple embodiments that provide a non-contact vibration analysis system for machinery and structures. The embodiments described therein provide a number of features and advantages, not least among them is a flexible predictive maintenance tool that use vibrations to diagnose fault conditions using a video-based tool for evaluating the dynamic motions in machinery without the need for edge visualization or identification of other specific objects in the scene.

For example, the descriptions contained in US Pub. No. 2016/0217587, titled "Apparatus and Method for Analyzing Periodic Motions in Machinery" (Hay, Jeffrey R.; published Jul. 28, 2016, Application No. 14/757,245 filed Dec. 9, 2015), the contents of which are fully incorporated herein by reference, refer to multiple embodiments of a system for analyzing periodic (i.e., repeated) motions in machinery. This system comprises one or more video acquisition devices, such as but not limited to one or more video cameras, webcams, or digital cameras integral in cells phones, positioned at a selected distance from a machine component or physical structure (i.e., object). This video acquisition device will be positioned with an unobstructed view of a selected portion of the object to obtain a video feed. This video, as is the case with the videos described in the present disclosure, is divisible into individual image frames, with each frame showing a static image of a scene, and with each frame being divisible into a plurality of pixels. This system further comprises a data analysis system, including a processor and memory to analyze the video file, such as by measuring a value which is characteristic of the object's physical movement over time to thereby determine the periodicity of that movement. The system in U.S. Pub. No. 2016/0217587 further comprises a data storage system to archive the video for later retrieval and comparison of the images and the measurements from the video, the image frames, or an enhanced version of the video. This comparison is the foundation for providing determining changes in the object's movement data, which may be indicative of mechanical anomalies.

In any such endeavor, however, it is important to understand that certain movements of interest by an object happen at such a high frequency as to not be discernible by a human observer with the naked eye or a person watching a video obtained from an actual scene with moving parts. For example, a vibration occurring in a machine component at 60 Hz, as an example, may need to be slowed down on video to discern what is actually happening with the component. With appropriate program instructions, the inventive system and methods disclosed herein may then be configured to compare spectrums for the two videos to see what peaks are shared. The shared peaks could be counted as normal behavior, whereas the peaks that are not common to the two spectra may be identified as changes in the vibration behavior, which may be associated with deteriorating conditions. Such approaches make the practice of the present embodiments more efficient and less prone to guess work.

Often, the conditions that indicate a problem or need for intervention that are captured by the video acquisition device are subtle ones that occur simultaneously with normal movements (i.e., substantially as designed and not a root cause or indicator of ongoing or future problems) of a machine or component. Consider a shaft that rotates as a normal movement, yet also has a vibration undiscernible to the naked eye that is accompanying this rotational movement. In this sense, the normal rotation of the shaft is not of concern, but one investigating the condition of the shaft would be interested in waveforms of each rotation from which the vibrational anomaly can be determined. Examples where visual inspection might be very helpful would include damaged or dirty blades, bent, bowed, or damaged shafts, and looseness or rubs. Accordingly, as discussed herein, the present embodiments efficiently and reliably achieve the objective of verifying specific fault conditions clearly based on a visual inspection based on recorded images acquired while the component is in normal operation.

SUMMARY

In an embodiment, after a user sets up a digital video camera to view the mechanical structure of interest, identifies the mechanical component to be inspected graphically from the image of the mechanical structure, the system identifies the dominant frequency of the component to be inspected (e.g., the periodic movement of a drive shaft), sets a desired frame rate, sets the shutter rate to the maximum or equivalently sets the brightness control or exposure time to the minimum value or sufficiently small enough value, and captures a video of minimum duration. As desired, a lighting check may be employed to recommend the need for additional external lighting. As described more fully herein, some embodiments provide a desirable feature through the use of multiple frequency spectra, in which a system automatically sets an acceptable sampling rate and duration to achieve the desired angular resolution based on the frequency of the periodic motion and the frame rates available in the camera, and the system automatically incorporates the use of aliasing as needed to obtain the optimum reconstructed video. Moreover, the system can be programmed so a user can override the automated selections as desired. Once the reconstructed video is available, the user can stop the motion playback of the mechanical component or slowly rotate through its periodic cycle to visually inspect all surfaces. As desired or needed, the original video can be stabilized to remove camera motion or filtered to remove other distracting motion. The reconstructed video can be played back at different rates and the motion can be looped and amplified to allow visualization of small motions such as shaft runout.

In one aspect of the inventive system and method, consider a shaft rotating or reciprocating at 30 Hz (30 repetitions every second). If the frame rate of the video camera is set at 30 frames per second, it would take one sample from each cycle of rotation or reciprocation at exactly the same angular or linear position on the shaft. If the video were played back to the user, the shaft would not appear to be moving. In order to prevent the 30 Hz frequency from aliasing in the recorded image the frame rate of the camera must be greater than two times the frequency of interest, in this case greater than 60 frames per second.

Now consider the situation that occurs if the video is recorded at 30.1 frames per second. The video frame captured at each rotation is at a slightly different angular location on the 30 Hz periodic motion of interest. During steady state operation, each frame captures the motion of the component at a slightly different angular location along the motion waveform. After collecting 10 seconds of data, 301 cycles of the 30 Hz motion are captured; and the full 360 degrees of the periodic waveform will be captured with a resolution of 300 samples (1.2 degrees of angular resolution). Without using the aliasing effect, this result would require a camera able to record with a frame rate of 9000 frames per second to achieve this result. But with present embodiments, once the video is captured and properly reconstructed, the component can be slowly rotated backward or forward through its motion to visually examine the component under the control of the user. This data may need to be filtered to remove motion that may be present at other frequencies, or to remove or normalize uneven illumination over the duration of the frames. Whether data is collected from applications with low frequencies of interest, for example less than 120 revolutions per minute (2 Hz) or from high frequencies, for example greater than 5400 revolutions per minute (90 Hz), this method will enable detailed evaluation of a single cycle of the motion of the component.

Accordingly, the result provides a high phase resolution even though the video camera used to acquire it has a limited frame rate, along with a modified playback rate adapted for improved visual inspection. Stated differently, the naked eye would not detect all the features when a single cycle happens in the span of 0.5 sec (30 Hz) with as much precision as if the cycle were slowed down to 150 seconds. In this regard, the limitations of the video camera operating at 30 frames per second approximate the same limitations of the human eye. However, even though acquired at a rate of 30 frames per second, aliased frequency enables playback to be slowed down so that very small features on the object being inspected can be discerned.

Additionally, the inventive system and method provide corollary features to assist a user. In some embodiments, a user is able to define an area of the machine or machine component from which to obtain aliased frequencies. This is accomplished by machine-readable program instructions that allow a user-controlled interface to define a region of interest on a monitor during video playback, appearing as a box around a particular area, portion or component of a machine to investigate. Subsequently, movements depicted in video as occurring in this region of interest are then processed as described herein. Examples of processing discussed in further detail herein include, without limitation, amplifying the movements in the video by differencing frames obtained in the video at two different times and multiplying the amplitude differences in those frames by a predetermined factor, rescaling, filtering out all frequencies except a subset of those frequencies identified in the region of interest from a frequency spectrum plot, or resampling the movement as an aliased frequency (e.g., changing from a sampling frequency of 60 Hz—i.e., 60 frames per second ("fps")—to a lower frequency such as 30 Hz). An example of these features to enhance the visual depictions in the processed video is found in US Pub. No. 2016/0300341 titled "Apparatus and Method for Visualizing Periodic Motions in Mechanical Components" (Hay, Jeffrey R. et al.; published Oct. 13, 2016, U.S. patent application Ser. No. 14/999,660, filed Jun. 9, 2016), the contents of which are incorporated by reference herein. This application, now patented as U.S. Pat. No. 10,062,411, describes multiple embodiments in which a new image sequence or sequences are computed, showing the movements of an object(s) in motion being visually amplified.

Other options and alternatives within the scope of these embodiments include machine-readable program instructions that operably control a slider bar or a circular dial allowing a user to rotate the orientation of the shaft being evaluated in the video. For example, a first position on the slider bar (e.g., to the far left if the slider bar is horizontal, or at the bottom if the slider bar is vertical) might be used to indicate the absolute position of the shaft at origin. From there, a second, user-selectable position on the slider bar would match a position of the shaft at any given point in its cycle as shown in the video based on the movement over time, represented by the second position on the slider bar. As an alternative to a slider bar, one might configure a circular dial controllable by a user for selecting the point of the cycle that will be shown, where a point on the dial is designated as absolute position (i.e., beginning point in a cycle) and the number of degrees the dial is turned may reflect the progress of the object within its cycle of motion. Furthermore, this phase control mechanism can be manipulated by a user for positioning of the shaft or other object being evaluated during playback, for example to focus upon a particular moment of movement being evaluated at a certain point along the timeline. This in turn would be used to provide phase indication characteristics relative to the position of the shaft at particular times in the video.

Various embodiments of this invention may utilize different methods for capturing video sampling data comprising a plurality of video images of a moving object. In many cases, the cameras will be positioned on a stationary frame of reference adjacent to the mechanical component under investigation. However, other embodiments may utilize a camera attached to a drone in order to get video from the proper angle or from multiple units in an application such as a wind turbine farm. In such embodiments the data may require stabilization processing to remove the motion associated with the drone. Sometimes this also is necessary for stationary applications because of floor motion produced by nearby equipment in a facility.

BRIEF DESCRIPTION OF DRAWINGS

The patent or application file with respect to the present disclosure contains at least one drawing executed in color. Copies of this patent or patent application publication with color drawing(s) will be provided by the Office upon request and payment of the necessary fee.

The drawings, schematics, figures, and descriptions contained in this application are to be understood as illustrative of steps, structures, features and aspects of the present embodiments. Accordingly, the scope of embodiments is not limited to features, dimensions, scales, and arrangements shown in the figures.

MULTIPLE EMBODIMENTS AND ALTERNATIVES

Embodiments described herein provide an improved manner of diagnosing the conditions of machinery and other moving objects by the detection of vibrational signatures. The detailed evaluation of a cycle of motion for such objects is able to approximate the resolution that would be obtained with much more expensive equipment marked by a frame rate acquisition capability that is unavailable in most commercially available cameras or very expensive and largely cost prohibitive where such capability might exist. The following descriptions are directed to the main aspects of this novel capability as well as corollary features that include, without limitation, the capability to focus on a specific region of interest depicted in the frame, freeze its motion or track it with very high definition through it cycle of repetition and, optionally, other processing enhancements such as motion amplification, filter frequency, phase indicators, and control of the object's placement within a cycle of motion.

In an exemplary embodiment, a system is provided which evaluates a moving object undergoing periodic motion, with the use of at least one video acquisition device (e.g., video camera) that acquires video images of the moving object. The frame rate on the video camera can be adjusted, allowing video images to be acquired at a frequency that is asynchronous with the frequency of movement of the object as it undergoes periodic motion, i.e., cycles of motion that can be reciprocating, rotational, elliptical, parabolic, and so forth. The sampling rate may not be fast enough to prevent the frequency of interest from appearing in the data as an aliased frequency and in this case, the acquisition rate is normally set slightly higher or lower than the frequency of interest so that one sample per cycle of motion is acquired. Alternatively, faster sampling rates (about twice the frequency of interest, for example) also can be used which will result in multiple samples being acquired on each cycle of repetition and reducing the total acquisition time required. The system further comprises a processor and a memory, the latter for storing images that are acquired and modified, and the former for operating a computer program suitable that executes a number of computer functions described herein. In some embodiments, the computer program operates to isolate video image frames collected over multiple cycles and reconfigure those into a modified video that represents one cycle of motion. Each of the video image frames represents a portion of the source video corresponding to a specific position in the cycle of movement of the object.

Aliased Slow Mode Acquisition

In some embodiments of the present disclosure, system features described herein enable a user to select a frame rate that is asynchronous with a frequency of interest. For example, consider a shaft that normally rotates at 20 Hz (20 cycles per second). The user may set the frame rate to 20.1 Hz, and the data that is acquired includes an aliased frequency of 0.1 Hz as a subset of the 20 Hz motion. Through a series of aliased frequencies obtained in this way, a user collects data to characterize the 20 Hz motion in a motion amplified data set. Although the actual time to complete a cycle takes 0.05 seconds, the system would need to collect 360 cycles of data to achieve a one-degree resolution in the reconstructed video. This would require the system to collect 18 seconds worth of data. The reconstructed video produced according to present embodiments would present one cycle of the shaft, or loop this cycle, at any playback speed which facilitates visual inspection including individual frames at any selected angle in the shaft rotation. Additionally, in some embodiments the system will have stabilized the original video to remove camera motion, filtered the video to remove frequencies not of interest to this inspection, or amplify the motion present in the shaft to allow the motion to be perceptible to the human eye. In some embodiments, the system is configured so a user can select one or more spatial regions where amplification is to occur, or alternatively where amplification is to be suppressed while the non-selected region is amplified.

In order to capture this data without the aid of the aliasing phenomena described herein, the camera would have needed to sample the shaft at 7200 frames per second. This frame rate is well above what is available for most cameras that are suitable for use in industrial applications and, if such high performance cameras were available, they would add significant cost to the inspection system. As described herein, when inspecting mechanical components with a high frequency of periodic motion, a complete cycle with high angular resolution could not be reconstructed without the use of the aliased frequencies. In this case, a user may filter captured video data to only include frequencies very close to 0.1 Hz in order to present the movement at these aliased frequencies without any contribution from other frequencies.

Figure 1:
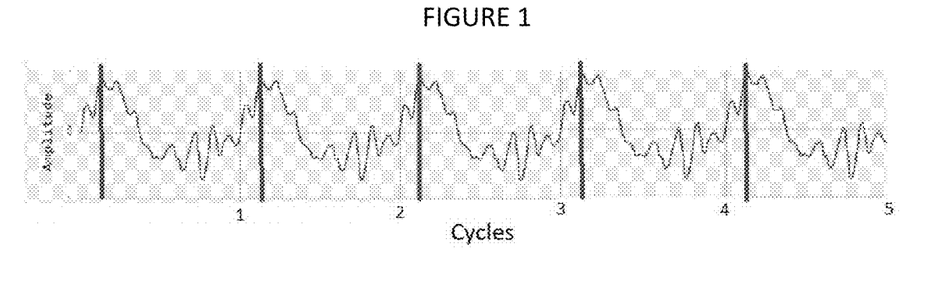
FIG. 1 is a graph that shows a periodic waveform from a repeated cycle of movement of a moving object, having been obtained exactly at the frequency of repetition, and representing collected sampling data sampled from the same position in each cycle of the waveform, in which the sampled data may be collected by capturing visual images digitally.
Figure 2:
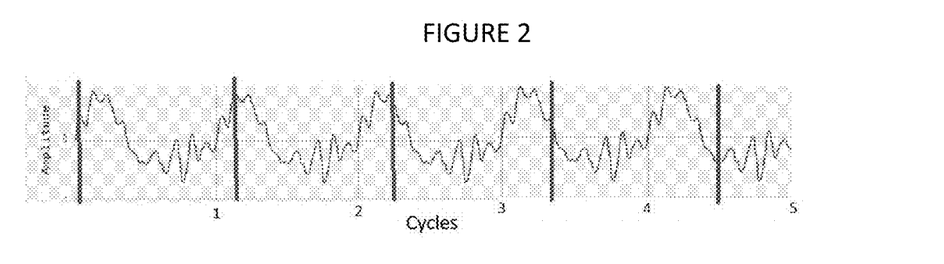
FIG. 2 is a graph that shows the periodic waveform out of phase with the frequency of a repeated cycle of movement of the moving object, and represents collected data sampled from different positions in the waveform cycle, according to multiple embodiments and alternatives.
Figure 3A:
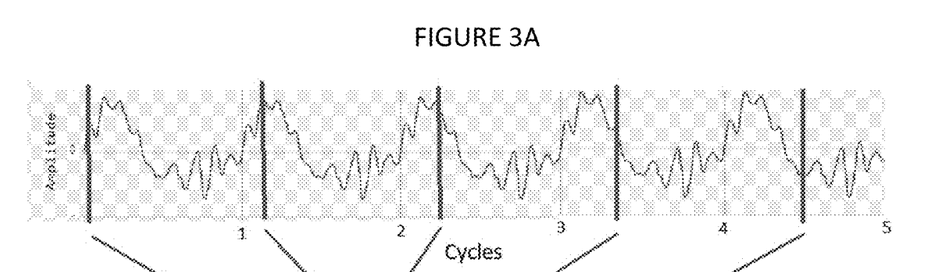
FIG. 3A is a graph that shows the periodic waveform likewise out of phase with the frequency of a repeated cycle of movement of the moving object, and represents collected data sampled from different positions in the waveform cycle, according to multiple embodiments and alternatives.
Figure 3B:
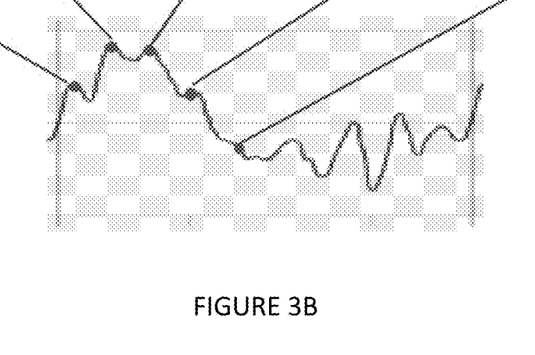
FIG. 3B is a reconstructed graph that provides a detailed view of the periodic waveform from aliased data collected on many cycles of the periodic motion waveform from FIG. 3A, according to multiple embodiments and alternatives.
Figure 4A:
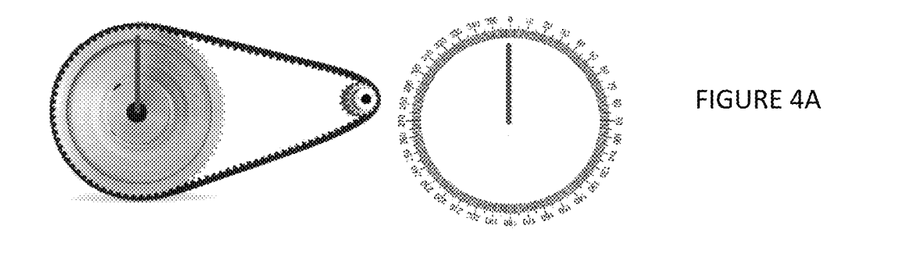
FIGS. 4A-4E offer schematic views representing damage to a tooth on a belt-pulley component at different angular positions, as an illustration of a condition which can be detected through the practice of multiple embodiments and alternatives described herein.
Figure 4B:
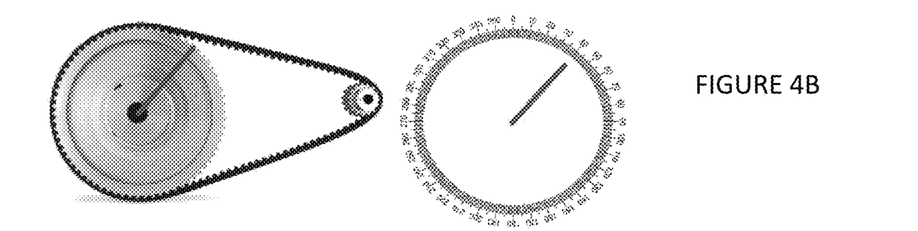
Figure 4C:
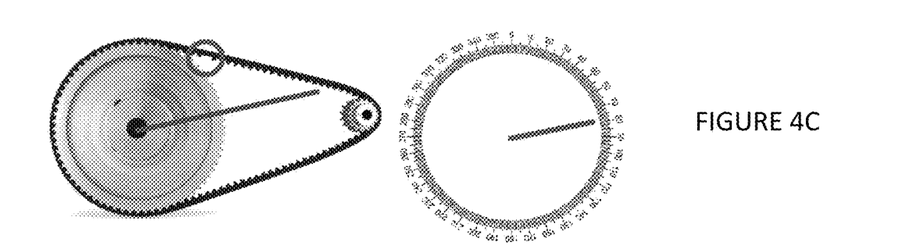
Figure 4D:
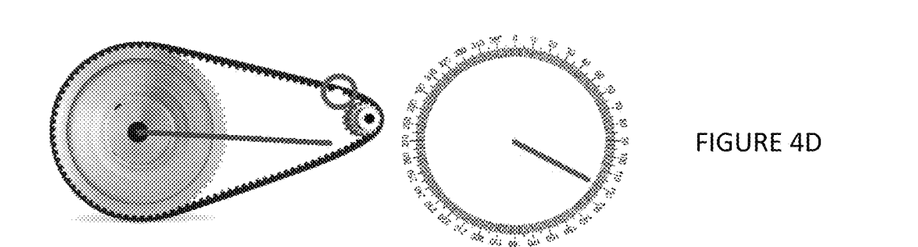
Figure 4E:
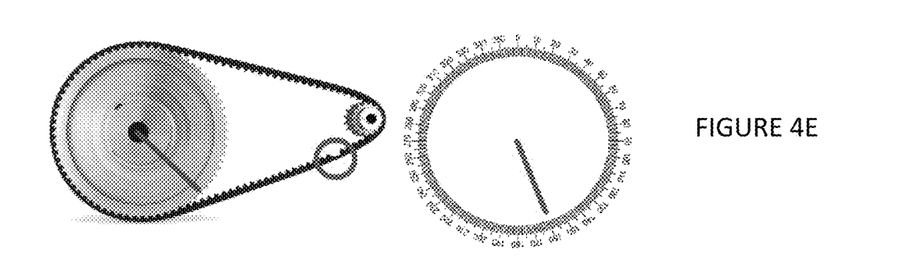

FIG. 1 illustrates the result of sampling a periodic waveform (graphing the amplitude of motion in repeated cycles) of a moving object exactly at the frequency of repetition of the mechanical component under investigation. Sampling the periodic waveform at some integer multiple of the frequency of repetition creates the same effect. In this circumstance, each sample is collected from the same position(s) in each cycle of the waveform. No matter how video frames data are acquired, the same angular positions are sampled from each cycle and no new information is gained by sampling multiple cycles of the mechanical component. FIG. 2 and FIG. 3A show the effect of sampling a periodic waveform asynchronously to the frequency of repetition. In this case, samples are acquired from different angular position(s) in each cycle of the waveform. In this case, the video frames captured from each cycle provides new information about the mechanical component. FIG. 3B, a graph extracted from a periodic waveform obtained by under-sampling in which the aliased frequencies were collected at a frequency different from the frequency by which the component completes each cycle, illustrates how the samples from multiple cycles can be repositioned into one cycle with greater angular detail. The same principles would also apply for a reciprocating object or piece of machinery as it cycles through its motions. Similarly, the video frames captured asynchronously to the periodic motion being investigated can be reconstructed into a video providing extremely high angular resolution of the mechanical component as it goes through one cycle of motion. This method of reconstructing a video sequence allows visual inspections to be performed without disrupting the operation of the machine which would otherwise not be possible.

An exemplary use of the inventive method may be as part of a shaft inspection tool. As frames are reconstructed and recombined from many cycles of operation, the video will display greater angular detail as more cycles of video are recorded. Previously, an example was described of a 0.1 Hz aliased frequency, but many other aliased frequencies are well within the scope of present embodiments. In all cases, the resulting video will enable the user to present a complete high phase resolution video of one or more periods of the motion of the mechanical component despite any limitations with respect to the frame rate of the camera as compared to the frequency of the periodic motion to be examined.

Other uses of the inventive aspects described herein are shown in several figures. For example, FIGS. 4A-E illustrate how this approach could be used to investigate a belt-pulley system on a machine. In these figures, a missing tooth from the belt is very apparent at locations when the belt is not in contact with a pulley wheel. Although for all practical purposes the belt cannot be inspected while the machine is in operation due to the speed of operation, the video inspection system described in this invention could, as further described herein isolate the frequency of the belt as distinguished from the rotational frequency of each sheave pulley; select an appropriate sampling rate for analyzing the belt; and acquire an appropriate number of cycles of rotation. The reconstructed video could then freeze the motion of the belt, or loop one cycle of the belt rotation repeatedly at the measured amplitudes or with the motion amplified at any playback speed selected by the user. In addition, the motion can be frozen, and the user can select views at any angular location in order to do a detailed visual inspection of the belt.

Figure 5A:
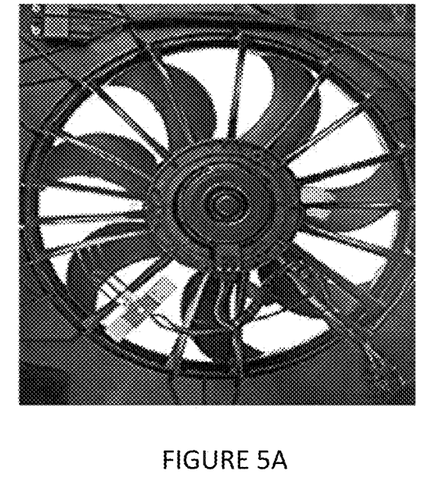
FIGS. 5A and 5B are photographs depicting damage to a first ventilation fan and a second ventilation fan, respectively, as an illustration of conditions which can be detected through the practice of multiple embodiments and alternatives described herein.
Figure 5B:
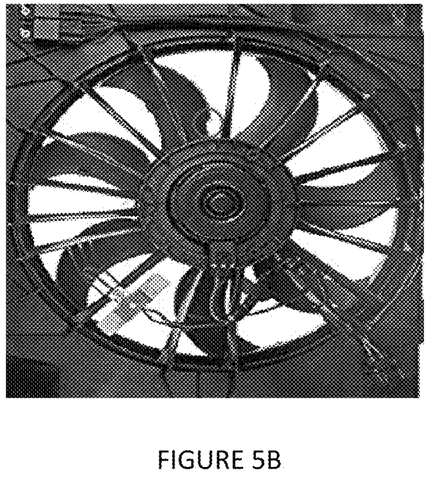

In FIGS. 5A and 5B, the ventilation fans have experienced damage that could not be seen with the fans in operation. FIG. 5A depicts a fan in a frozen condition where the damage due to rust can be seen on the blade around the angular position of 90 degrees (3:00 on a clock face) although partially obscured by a support structure, and FIG. 5B depicts the fan in a damaged condition in which the eroded blade is easily visible as noted by a circle near angular position zero degrees (12:00 on a clock face). Such are examples of conditions that can be detected and analyzed by the practice of embodiments provided herein.

Figure 6:
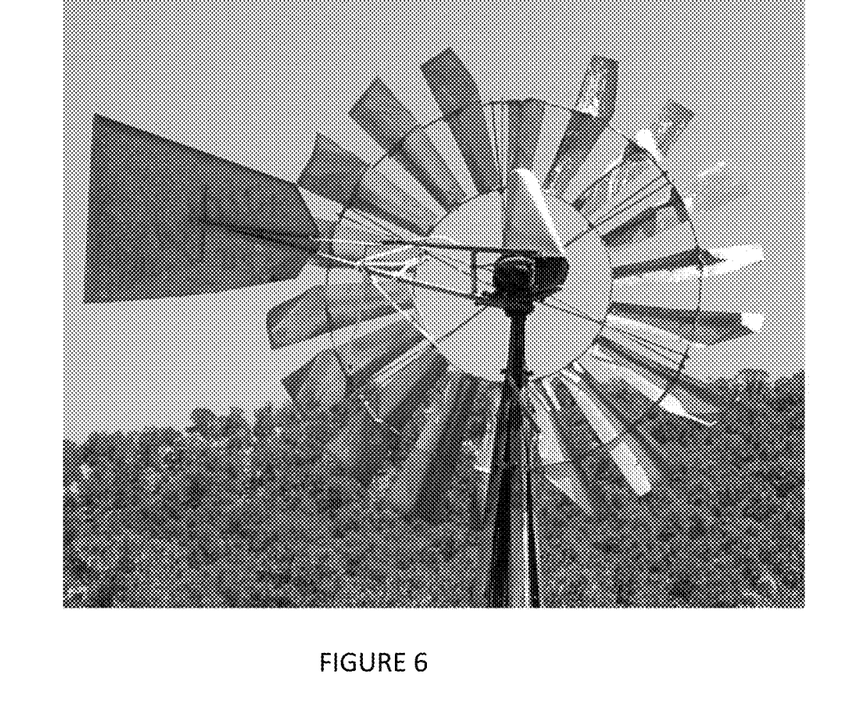
FIG. 6 is a single frame from the reconstructed video of a windmill with multiple damaged blades, as an illustration of a condition which can be detected through the practice of multiple embodiments and alternatives described herein.
Figure 7A:
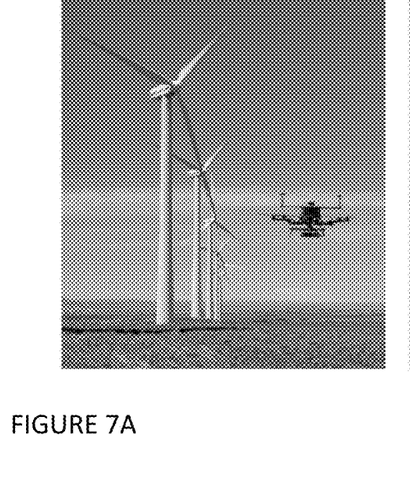
FIGS. 7A and 7B are photographs that offer perspective views of one or more wind turbines with acquisition of video images collected with drones, according to multiple embodiments and alternatives described herein.
Figure 7B:
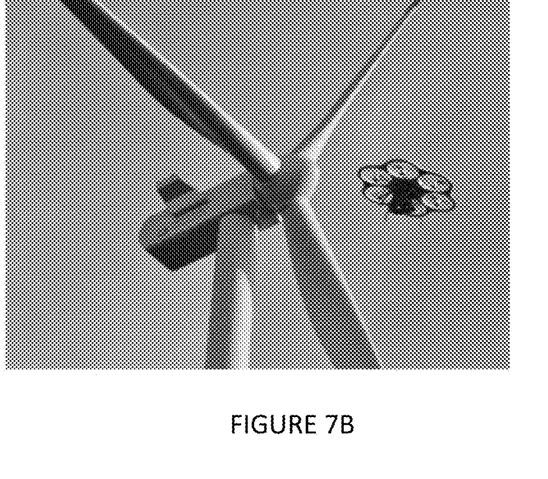
Figure 8:
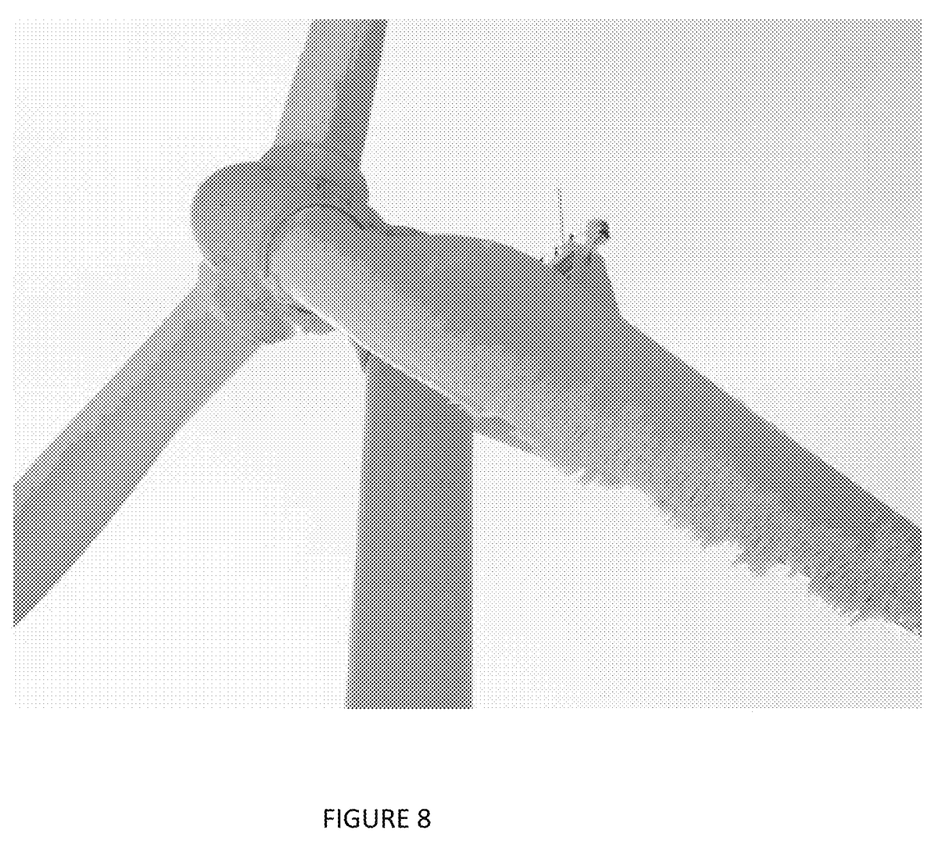
FIG. 8 is a photograph of a blade with ice accumulation on the turbine blades that would be very difficult to evaluate in operation, yet visible with reconstructed video images that enable more detailed visual inspection during normal turbine operation, in accordance with multiple embodiments and alternatives described herein.

Likewise, FIG. 6 is a single frame from the reconstructed video of a windmill with multiple damaged blades. Again, this illustrates a condition which can be detected through the practice of present embodiments. Even though the presence of some damage could be seen when the windmill was turning at slow speeds, the full extent of the damage could not be assessed during operation to the extent provided through the practice of the present embodiments. In like manner, conditions associated with the wind turbines in FIGS. 7A-7B and the ice accumulation on the blade in FIG. 8 can be evaluated and diagnosed prior to failure, using the systems and methods herein. Although the camera may need to be mounted on a drone to gain an advantageous perspective of the wind turbine, the ability to perform detailed blade inspections during normal operations could not be accomplished without the use of embodiments such as those described herein.

In some embodiments, a user may select a low exposure time to limit the amount of motion blur. The system may do this automatically. The system may adjust the settings of the camera automatically so that they are appropriate for inspecting a shaft requiring a small exposure time. The system may automatically determine the speed of the shaft, and automatically set the frame rate of the camera appropriately so that it is slightly off the rate of the shaft to produce the aliased frequency as discussed herein. In the above example, once the of 20 Hz motion of interest has been specified or measured by any means known in the art, the system will automatically select a frame rate of the camera, or this can be set by the user to a value suitable for producing an aliased frequency, such as 20.1 fps to produce a 0.1 Hz aliased frequency, or a 30.2 fps to produce a 0.2 Hz aliased frequency, as non-limiting examples. The signal could also be sampled asynchronously at frame rate of 100.1 Hz without aliasing and capture 5 points on each period of the 20 Hz signal of interest. In this case, the system would only need to collect about 3.5 seconds or 72 cycles of data to achieve one degree of angular resolution. The faster sampling rate works well and reduces data acquisition time if the system is operating in a very stable manner but gives less satisfactory results if there is some variation from cycle to cycle of operation.

While present embodiments are not limited to any specific sampling rate, in some cases a sampling rate may depend on and be determined by user preference for resolution between image frames being acquired and repositioned in a reconstructed (i.e., modified) video. For example, "Freq" means the frequency of a given periodic motion of interest expressed in Hz; "N" means a number of samples to acquire per cycle of motion; "Resolution" refers to a desired angular resolution in a reconstructed period of motion of an object expressed in degrees; "ΔRev" defines the resolution expressed as a fraction of a revolution. With the foregoing meanings, the equations for determining a sampling rate, SampleRate, expressed in units of frames per second are given below:

$$\Delta Rev = Resolution/360$$

$$SampleRate = N*Freq*(1+\Delta Rev)$$

The value of N could be established by the user or set automatically by the processor to obtain the highest possible sampling rate available from the camera and minimize the total sampling interval required to achieve the specified resolution in the reconstructed cycle of repetition.

Figure 9A:
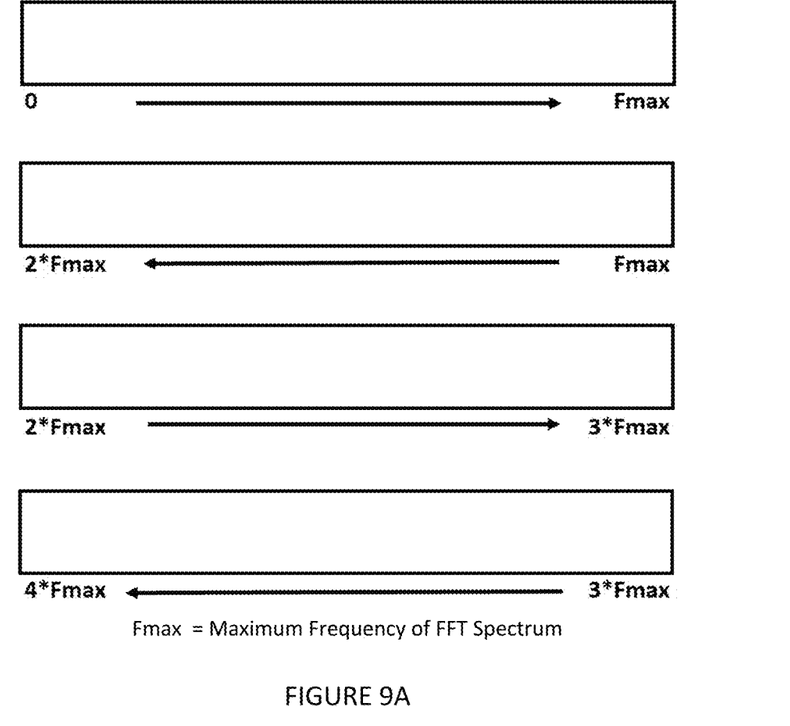
FIG. 9A and FIG. 9B provide an illustration of an aliasing effect resulting from digital data captured at different sampling rates, according to multiple embodiments and alternatives.
Figure 9B:
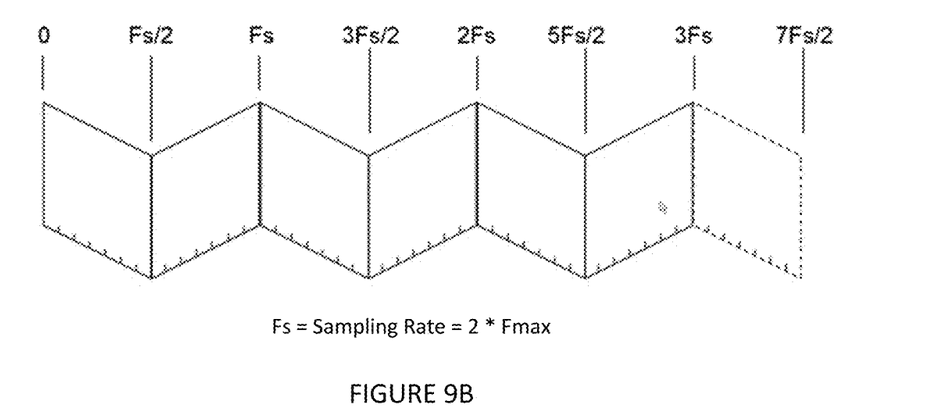

FIGS. 9A-B and Table 1 below illustrate the phenomena of aliasing which occurs when sampling data. Here, the aliasing effect results from digital data captured at different sampling rates. Aliasing is generally prevented when digitally processing signals by applying analog filters to remove the higher frequencies that would be aliased, to prevent these frequencies from being folded into the lower frequency data. An equation which can be used to determine location of the aliased frequency into the range of the digitally sampled data is $FR=TF/F_{max}$, where TF is the true frequency, FR is the frequency ratio, and $F_{max}$ is the maximum frequency in the frequency spectrum such that $F_{max}=0.5$ times the Sample Rate (or Frame Rate).

When the form of FR is viewed as a whole number (N) plus a fraction (Frac), FR=N.Frac, then the aliased frequency (AF) can be calculated using the following formulas:
If N is Odd, then AF=Fmax−Frac*Fmax
If N is even, then AF=Frac*Fmax By way of further exemplary illustration, Table 1 provides the different aliased frequencies which occur for a sine wave of 384 Hz when sampled at less than two times this value.

Table 1. Table of aliased frequencies when measuring a 384 Hz motion of interest resulting from various frame rates:

| Frames per second | $F_{max}$ Frequency (Hz) | Aliased Frequency (Hz) |
| --- | --- | --- |
| 100 | 50 | 16.0 |
| 120 | 60 | 24.0 |
| 200 | 100 | 16.0 |
| 300 | 150 | 84.0 |
| 400 | 200 | 16.5 |
| 500 | 250 | 116.5 |

Reconstruction of Frames

In some embodiments, a user selects a frame rate slightly off from the periodic motion of a machine or component undergoing movement at a frequency of interest. That sampling frequency may be asynchronous (out of phase) with the vibration or motion of interest. To illustrate in non-limiting fashion, the frame rate might be 3% higher or lower than the actual frequency of rotation. For example, if the machine has a shaft rotating at 30 Hz, the camera may record images at 30.1 frames per second, or "fps" (30.1 Hz), referred to herein as an aliased sampling rate (ASR) frequency. An ASR frequency may be selected by a user, or automatically set by the system. An ASR frequency may be greater or less than the actual frequency of the moving object. For example, in some embodiments, an ASR frequency which is 1 Hz or less different than the actual frequency of the moving object may be suitable. At higher frequencies, a difference of 10 Hz may also be suitable, or in some cases the difference between an ASR frequency and the actual frequency may be in tenths of a Hz. The result is the camera will sample different locations on the rotating or reciprocating component; this results in the sampling of different positions on the waveforms for each cycle, as illustrated in FIG. 2. This may be used to sample frequencies much higher than can normally be achieved by the camera. This method may be beneficial when the machine is operating at a steady state and the motion of the machine component or vibration do not change.

The fact that the camera keeps sampling at different angular positions of the periodic signal will allow the software to capture enough images over time that each angular position of the periodic signal can be represented in the video, as illustrated in FIGS. 3A-B. In this manner, a camera may acquire data for a sufficient time to reconstruct a full waveform or periodic event (seen in the video in this case). For example, in the first pass of the periodic signal the camera may acquire an image in the periodic signal that represents the 10th degree position of 360 degrees. Then the next pass at the periodic signal may enable the camera to capture the 15th degree. This would keep occurring for 72 cycles of the motion (360/5=72), then the video is reconstructed to show one periodic signal that is really comprised of images from frames selected from multiple cycles of the signals. This allows the camera to achieve a much higher resolution video as well as faster vibrations than can normally be achieved by a camera.

As previously noted, various forms of image processing are within the scope of the present embodiments, e.g., amplification or rescaling. Another capability involves recording a moving piece of equipment, for example a shaft rotating at 30 Hz, to return a high-resolution video of the motion with high angular resolution. To further illustrate, in a shaft rotating or reciprocating at 30 Hz, if acquisition was done by setting the framerate of the camera at 30.1 Hz, one would slowly acquire a series of videos separated by 33.33 milliseconds (1.0/30.1) in time. For the 30 Hz periodic motion of interest, the system could acquire video data over 301 cycles in 10 seconds, providing a resolution of 1.2 degrees in the single cycle presented in the reconstructed video. Reconstructing the full or substantially full waveform in this manner would allow reconstruction of 30 Hz waveforms providing full or near full imaging of the motion in the scene.

It will be appreciated that the methods described here will result in many frames, in the video content acquired over many cycles of the periodic motion of interest. In the previous example, 1 image per cycle was stored (representing the aliased frequency), but by keeping all the acquired images and assigning them to a particular phase of rotation, such as in the example of a rotating shaft, the system is able to reconstruct one cycle in the appropriate order by filling in gaps of the shaft's position as new images are acquired. Once every phase of the rotation is represented (depending on desired resolution), the acquisition can be stopped. Sampled frames are assigned phase values based on the time at which the frames are acquired. If the frequency of the periodic motion of interest is known, and the elapsed time for acquiring each frame is known, then the phase position for each frame in its respective cycle of motion can be calculated or determined.

Automatic Frame Rate Determination

A problem that exists with currently available methods is the need for the user to set the frame rate for capturing the video images. For a user who may lack complete knowledge of signal processing or the current operational state of the machine, this may result in under-sampling, as well as lost efficiency through laborious trial and error as the user attempts to determine an appropriate frame rate on the camera.

Another embodiment which may allow a user with less skill to obtain the desired results also requires the acquisition of two separate videos. In a first acquisition, the camera is set to its highest frame rate for the visual field selected or at least 2.0 times the highest frequency of interest. When the frequency for the motion of interest is determined as a result of being selected by the user from a frequency spectrum, the system automatically determines the best sampling rate (or a suitable sampling rate) and the collection duration for capturing the second video recording to provide visual inspection of the mechanical component.

Further, as data about a machine or machine component is gathered, a user may be aided by knowing/determining the frequency of interest ahead of time from some other external measurement such as a tachometer and having a steady state condition during acquisition. Accordingly, in some embodiments a user may enter the value of the rate of rotation or reciprocation of the component of interest, and the system automatically determines the best sampling rate (or a suitable sampling rate) and the collection duration for capturing the video recording to provide visual inspection of the mechanical component with a desired degree of angular resolution.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of embodiments and alternatives are meant to illustrate, rather than to serve as limits on the scope of what has been disclosed herein. The descriptions herein are not meant to limit the understanding of the embodiments to the precise forms disclosed. It will be understood by those having ordinary skill in the art that modifications and variations of these embodiments are reasonably possible in light of the above teachings and descriptions.

What is claimed is:

1. A system for evaluating a moving object undergoing periodic motion using at least one video acquisition device that acquires sampling data as a plurality of video images of the moving object which are divisible into individual video image frames, and with each frame being divisible into a plurality of pixels, comprising:
   a video acquisition device configured with an adjustable frame rate to obtain a source video of the moving object, wherein the adjustable frame rate allows video images to be acquired at a sampling rate that is asynchronous with a frequency of a repeated cycle of movement of the moving object;
   a processor and a memory for storage of the source video including individual video frames; and a computer program operating in said processor to:
      isolate a plurality of video image frames collected from a plurality of repeated cycles of movement of the moving object, wherein each video image frame represents a portion of the source video corresponding to a specific position in the repeated cycle of movement of the moving object; and
      create a modified video by repositioning one or more isolated video image frames according to a specific position of the moving object in its repeated cycle of movement.

2. The system of claim 1, wherein the sampling rate occurs at a frequency that causes a rate of repetition of the moving object's motion to be aliased in the sampling data.

3. The system of claim 1, wherein the repeated cycle of movement of the moving object is rotational motion and the sampling rate is set at a rate greater than two times the rate of repetition for said object, thereby producing multiple collected samples on each revolution with no aliasing of rotational frequency in the collected samples.

4. The system of claim 1, wherein the computer program further operates in said processor to select a region of interest within at least one of the video image frames, and the computer program operates to amplify motion in the region of interest.

5. The system of claim 4, wherein the computer program further operates in said processor to freeze at least one movement inside the region of interest where motion is amplified or freeze at least one movement outside the region of interest where motion is amplified.

6. The system of claim 1, wherein the computer program further operates in said processor to select a region within at least one of the video image frames and amplify all motion in said at least one video image frame except motion in the selected region.

7. The system of claim 1, wherein repositioning the isolated video images comprises assigning a plurality of the isolated video images to a phase of motion.

8. The system of claim 1, wherein the computer program further operates in said processor to display the modified video at a higher resolution than the source video.

9. The system of claim 1, wherein the computer program further operates in said processor to automatically set the frame rate of the video acquisition device based on rate of rotation or reciprocation of the moving object.

10. A method for evaluating a moving object undergoing periodic motion, comprising:
acquiring a source video of the moving object at a sampling rate that is asynchronous with a frequency of a repeated cycle of movement of the moving object;
storing the source video in a memory that is operatively connected to a processor, wherein the source video comprises a plurality of video images of the moving object, and wherein the video images are divisible into individual video image frames and the video image frames are divisible into a plurality of pixels; and
executing a computer program in said processor to:
isolate a plurality of video image frames collected from a plurality of repeated cycles of movement of the moving object, wherein each video image frame represents a portion of the source video corresponding to a specific position in the repeated cycle of movement of the moving object; and
create a modified video by repositioning one or more isolated video image frames according to a specific position of the moving object in its repeated cycle of movement.

11. The method of claim 10, wherein the sampling rate occurs at a frequency that causes a rate of repetition of the moving object's motion to be aliased in the sampling data.

12. The method of claim 10, wherein the repeated cycle of movement of the moving object is rotational motion, and further comprising setting the sampling rate at a rate greater than two times the rate of repetition for said object, thereby producing multiple collected samples on each revolution with no aliasing of rotational frequency in the collected samples.

13. The method of claim 10, further comprising executing the computer program in said processor to select a region of interest within at least one of the video image frames and amplify motion in the region of interest.

14. The method of clam 13, further comprising executing the computer program in said processor to freeze at least one movement inside the region of interest where motion is amplified or freeze at least one movement outside the region of interest where motion is amplified.

15. The method of claim 10, further comprising executing the computer program in said processor to select a region within at least one of the video image frames and amplify all motion in said at least one video image frame except motion in the selected region.

16. The method of claim 10, wherein repositioning the isolated video images comprises assigning a plurality of the isolated video images to a phase of motion.

17. The method of claim 10, further comprising executing the computer program in said processor to display the modified video at a higher resolution than the source video.

18. The method of claim 10, further comprising executing the computer program in said processor to automatically set the frame rate of a video acquisition device based on rate of rotation or reciprocation of the moving object.

* * * * *